United States Patent [19]

Moores

[11] Patent Number: 4,631,827
[45] Date of Patent: Dec. 30, 1986

[54] ELECTRIC KNIFE DRIVE MECHANISM

[75] Inventor: Gregory E. Moores, Reistertown, Md.

[73] Assignee: Black & Decker, Inc., Newark, Del.

[21] Appl. No.: 689,930

[22] Filed: Jan. 9, 1985

[51] Int. Cl.⁴ .............................................. B26B 7/00
[52] U.S. Cl. ..................................... 30/272 A; 74/56
[58] Field of Search ............. 30/272 A, 272 R; 74/56, 74/57

[56] References Cited

U.S. PATENT DOCUMENTS

| | | | |
|---|---|---|---|
| 2,579,642 | 12/1951 | Bachman | 74/57 X |
| 3,152,398 | 10/1964 | Freeman | 30/272 |
| 3,300,857 | 1/1967 | Rosen et al. | 30/272 |
| 3,303,563 | 2/1967 | Peterson | 30/272 |
| 3,315,356 | 4/1967 | Swanke | 30/272 A |
| 3,337,952 | 8/1967 | Rosen | 30/272 |
| 3,337,954 | 8/1967 | Robison | 30/296 |
| 3,344,685 | 10/1967 | Crouzet | 74/56 X |
| 3,357,102 | 12/1967 | Korshak | 30/272 |
| 3,359,637 | 12/1967 | Hansen | 30/272 |
| 3,374,684 | 3/1968 | Greven | 74/56 |
| 3,606,216 | 9/1971 | Chambers | 30/296 |
| 4,164,813 | 8/1979 | Dittert et al. | 30/272 A |

Primary Examiner—Jimmy C. Peters
Attorney, Agent, or Firm—Finnegan, Henderson, Farabow, Garrett & Dunner

[57] ABSTRACT

An electric knife having a housing, a motor fixed in the housing having a drive shaft disposed for rotation about a drive axis, a spur gear fixed to the end of the drive shaft, a flange fixed to the motor including an integrally formed, axially-projecting output shaft coaxial to an output axis and parallel to the drive axis, an output gear in meshing engagement with and driven by the spur gear disposed on the output shaft for rotation about the output axis, a tubular element coaxially engaging the output gear for rotation therewith about the output axis, the tubular element including a cylindrical cam in the outside surface thereof, and a pair of blade holders disposed in the housing in adjacent, opposed relation for independent, linear reciprocation parallel to and on opposite sides of the output axis. Each blade holder has a first end for releasably engaging a blade and a second end including a cam follower engaging the cam, the cam followers engaging the cam at positions 180 degrees apart such that rotation of the output gear generates independent, opposite linear reciprocation of the blade holders.

19 Claims, 5 Drawing Figures

4,631,827

ELECTRIC KNIFE DRIVE MECHANISM

BACKGROUND OF THE INVENTION

1. Field of the Invention

The invention concerns electric knives and, in particular, the drive mechanism therefor.

2. Description of Related Art

Known electric knives have complex drive mechanisms generally incorporating worm gear arrangements for converting rotational drive of a motor to linear reciprocation of the blades. Such knives are expensive, are difficult to assemble, require multiple parts having interdependent tolerances, and are subject to frequent failure due to the many parts. Additionally, the worm gear arrangements are not as efficient as spur gear sets imposing power requirements which generally preclude use of small motors or battery power.

Examples of such prior art electric knives are shown in U.S. Pat. Nos. 3,152,398; 3,300,857; 3,303,563; 3,357,102; 3,337,954; and 3,606,216.

The subject invention overcomes the disadvantages of the prior art by providing a simple drive mechanism having few parts and incorporating a spur gear set.

Additional advantages of the invention are set forth in part in the description which follows, and in part will be obvious from the description, or may be learned by practice of the invention.

SUMMARY OF THE INVENTION

The objects and advantages of the invention may be realized and attained by means of the instrumentalities and combinations particularly pointed out in the appended claims.

The subject invention is an electric knife comprising a housing; drive gear means disposed in the housing for rotation about a drive axis; power means for selectively rotating the drive gear means; reduction gear means disposed in the housing in meshing engagement with the drive gear means for rotation about an output axis parallel to the drive axis; a pair of blade holders disposed in the housing in adjacent, opposed relation for independent, linear reciprocation parallel to and on opposite sides of the output axis; and cam means driven by the reduction gear means and operatively engaging the blade holders for generating independent, opposite linear reciprocation of the blade holders.

Preferably, the power means is a motor having a drive shaft and the drive gear means is a spur gear mounted on the end of the drive shaft. The reduction gear means is preferably an internal spur gear in meshing engagement with the spur gear on the drive shaft for rotation about an output axis parallel to the drive axis.

The cam means preferably comprises a cylindrical cam coaxial with and driven by the reduction gear means for rotation about the output axis and a cam follower fixed to each blade holder, each cam follower operatively engaging the cam 180° apart from the other cam follower.

BRIEF DESCRIPTION OF THE DRAWINGS

The accompanying drawings, which are incorporated and constitute a part of the specification, illustrate an embodiment of the invention, and, together with the description, serve to explain the principles of the invention.

DESCRIPTION OF THE PREFERRED EMBODIMENTS

Figure 1:
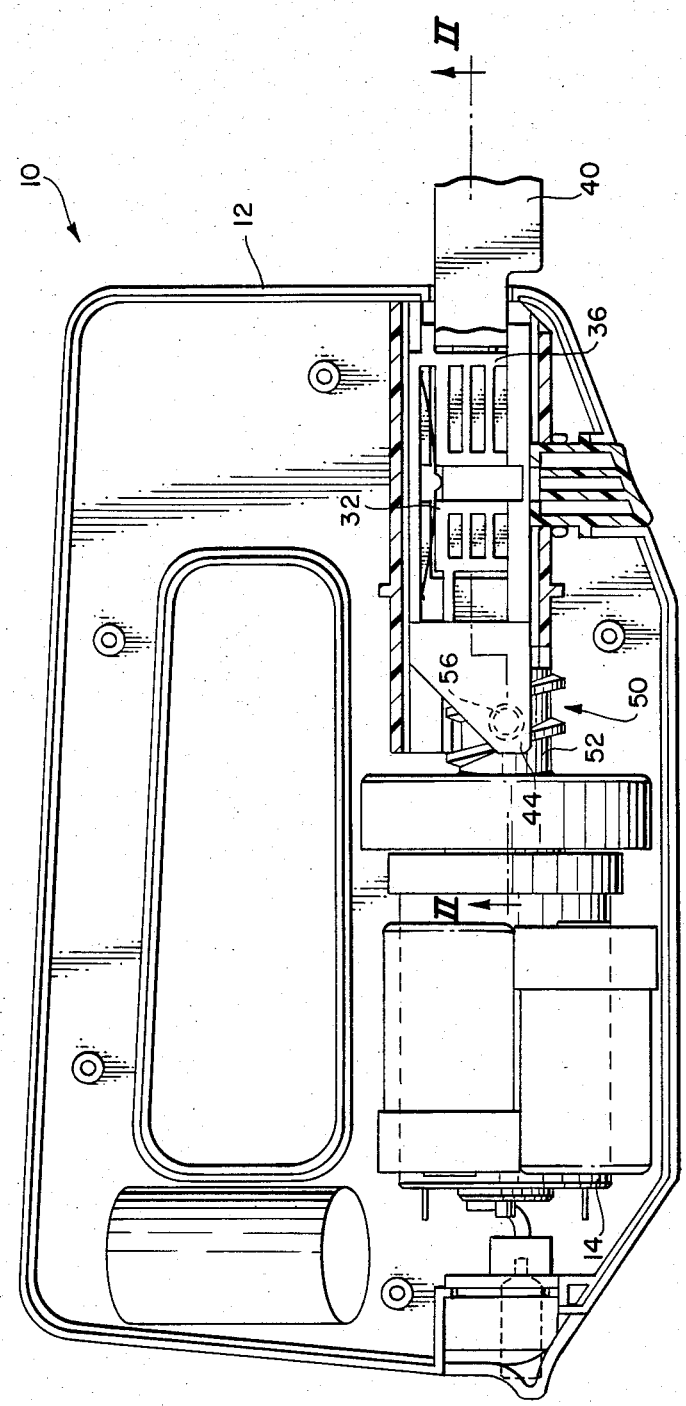
FIG. 1 is a cross-sectional view of an emodiment of the invention.

Reference will now be made in detail to the present preferred embodiments of the invention, examples of which are illustrated in the accompanying drawings.

The electric knife of the invention comprises a housing, drive gear means disposed in the housing for rotation about a drive axis, and power means for selectively rotating the drive gear means. In the embodiment depicted in the drawings (FIGS. 1–4 where like components are designated by the same number), the electric knife 10 includes a housing 12. Motor 14 constituting the power means is disposed in housing 10 and includes drive shaft 16 for rotation about drive axis D. Spur gear 18 is the drive gear means which is fixed to output shaft 16 for rotation therewith about drive axis D.

Figure 2:
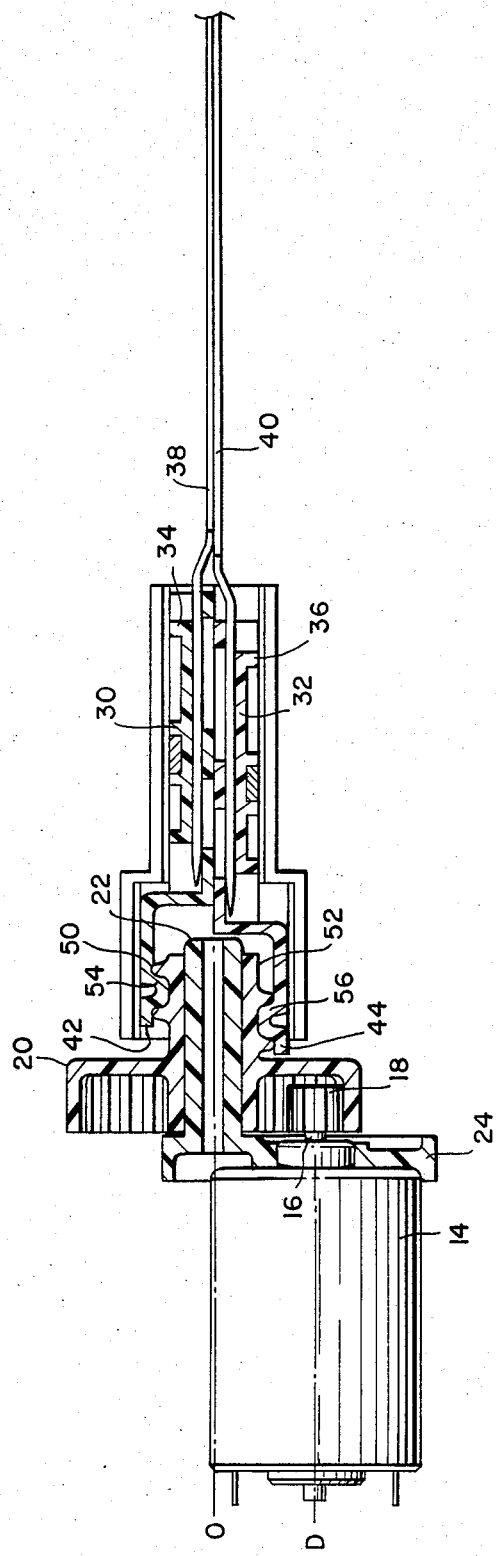
FIG. 2 is a cross-sectional view of the drive mechanism of the embodiment of FIG. 1 taken on line II—II.
Figure 4:
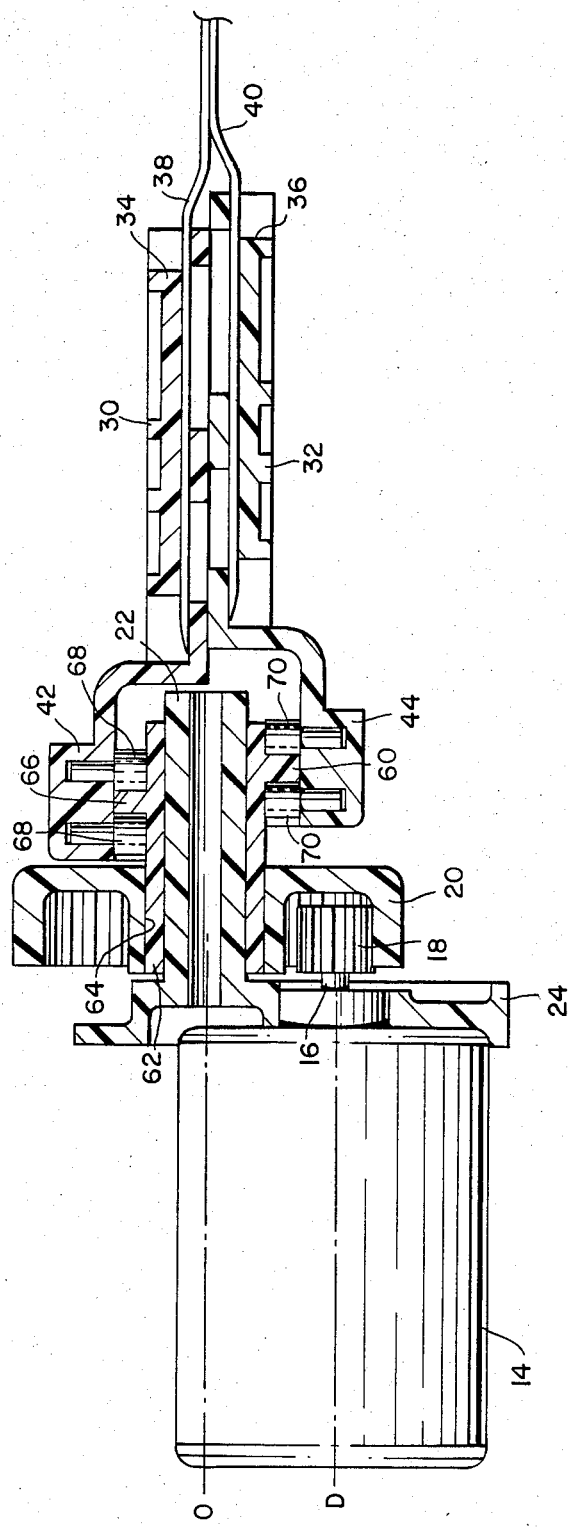
FIG. 4 is a cross-sectional view of the drive mechanism of the embodiment FIG. 3 taken on line IV—IV.

In accordance with the invention, the electric knife also comprises reduction gear means disposed in the housing in meshing engagement with the drive gear means for rotation about an output axis parallel to the drive axis. As depicted in FIGS. 2 and 4, the reduction gear means comprises internal spur gear 20 in meshing engagement with spur gear 18 for rotation about an output axis O. Output axis O is parallel to drive axis D.

Preferably, internal spur gear 20 is rotatably mounted on an output shaft 22 coaxial with output axis O. Output shaft 22 is preferably an integral projection of flange 24 which is fixed to motor 14. By this arrangement, the relationship between spur gear 18 and internal spur gear 20 is fixed.

In accordance with the invention, a pair of blade holders are disposed in the housing in adjacent, opposed relation for independent, linear reciprocation parallel to and on opposite sides of the output axis. As depicted in FIGS. 2 and 4, blade holders 30, 32 are disposed in housing 12 in adjacent, opposed relation. Holders 30, 32 are independent of each other and are disposed for linear reciprocal movement parallel to and opposite sides of output axis O.

Preferably, each blade holder 30, 32 has a first end 34, 36 for releasably engaging a blade 38, 40 and a second end 42, 44.

In accordance with the invention, the electric knife further includes cam means driven by the reduction gear means and operatively engaging the blade holders for generating independent opposite linear reciprocation of the blade holders.

In the embodiment of FIGS. 1 and 2, the cam means comprises a cylindrical cam 50 coaxial with and driven by internal spur gear 20 for rotation about output axis O. Preferably, a tubular extension 52 is integrally formed with and coaxially projects from internal spur gear 20. Output shaft 22 is elongated axially to serve as a bearing surface for rotation of tubular extension 52 with internal spur gear 20. By forming the output gear or internal spur gear 20 in one piece with tubular extension 52 on which cam 50 is formed, the relationship between internal spur gear 20 and cam 50 is fixed and the number of pieces is reduced. With the one-piece output gear and cam rotatably disposed on output shaft 22, the relationship of the cam to the drive shaft 16 is fixed.

The cam means also preferably includes a cam follower integral with each blade holder. In the embodiment of FIGS. 1 and 2, cam followers 54, 56 are integrally formed radial projections on second ends 42, 44 of blade holders 30, 32. Cam followers 54, 56 slidably engage cam 50 at positions 180 degrees apart such that rotation of internal spur gear 20 and cam 50 will generate independent, opposite linear reciprocation of blade holders 30, 32.

Cam 50 is preferably formed by a slot on the outside surface of tubular extension 52.

Figure 3:
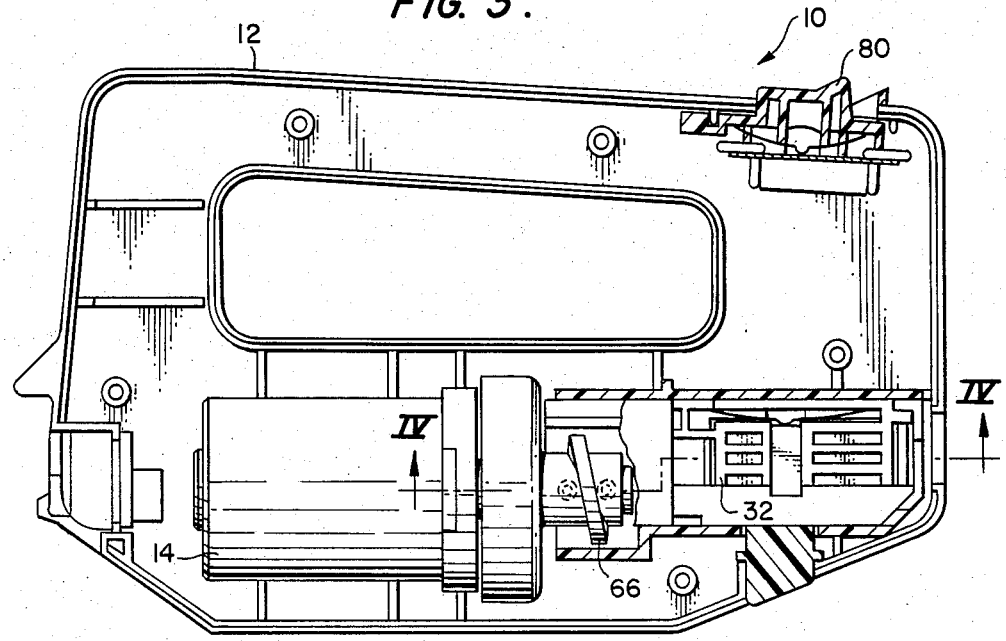
FIG. 3 is a cross-sectional view of a second embodiment of the invention.
Figure 5:
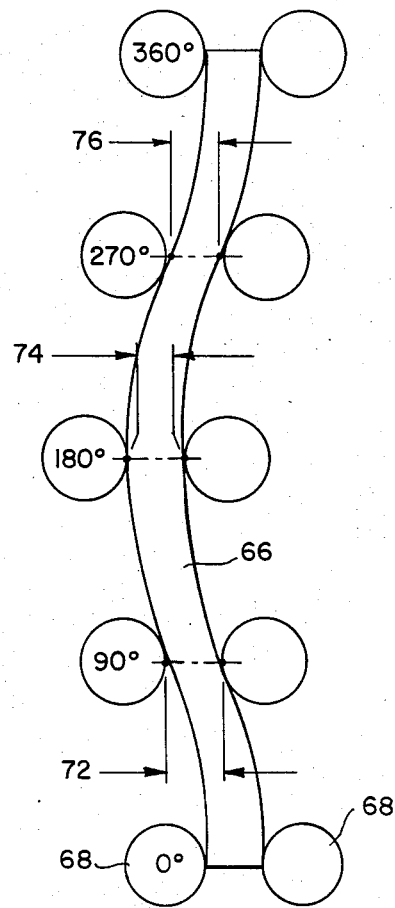
FIG. 5 is a diagrammatic representation of the cam means of the embodiment of FIG. 3.

In the embodiment depicted in FIGS. 3-5, the cam means comprises a cylindrical cam 60 coaxial with and driven by internal spur gear 20 for rotation about output axis O. Preferably, cam 60 includes a tubular projection 62 coaxially engaging internal spur gear 20. Tubular projection 62 may be slidably disposed in axial bore 64 of internal spur gear 20; a portion of the contiguous surfaces of bore 64 and projection 62 being formed to cooperate and prevent relative rotation between internal spur gear 20 and projection 62. In the alternative, tubular projection 62 may be fixed in bore 64. Projection 62 with cam 60 at one end thereof and internal spur gear 20 at the other end thereof is disposed for rotation on output shaft 22.

The cam 60 comprises a radially projecting rib 6 defining a generally cycloidal or harmonic path. The cam followers preferably comprise pairs of axially spaced rollers 68-70 radially projecting from second ends 42, 44 of blade holders 30, 32. The rollers, preferably of sintered iron, are rotatably disposed on pins 72 fixed to second ends 42, 44 of blade holders 30, 32 and are spaced to engage rib 66 180 degrees apart such that rotation of cam 60 causes linear reciprocation of blade holders 30, 32.

Rib 66 may define a cycloidal path in order to reduce acceleration forces at the high and low points of the motion or where the direction of linear motion of blade holders 30, 32 is reversed. Rib 66 may be modified by thinning in the steep sections of the cam which allows reduction of free play between the rollers and the cam. This structural relationship is depicted diagrammatically in FIG. 5. Rollers 68 are spaced a fixed distance 72 and rib 66 has a thickness 74 at the high and low points (180 degrees and 360 degrees) which substantially prevents free play between rollers 68. This thickness 74 is tapered to a reduced thickness 76 between the high and low points to allow free passage of rollers 68.

In both embodiments, cylindrical cams 50, 60 preferably have a rise which is either harmonic or cycloidal.

In operation, motor 14 is selectively activated by a switch mechanism 80 to rotate drive shaft 16 and spur gear 18. Rotation of spur gear 18 rotates at reduced speed internal spur gear 20 and cam 60. Cam followers 68, 70 which engage cylindrical cam 60 are axially moved in reciprocating fashion in opposite directions thereby linearly reciprocating blade holders 30, 32. With blades 38, 40 secured in one end 34, 36 of blade holders 30, 32, the blades linearly reciprocate in opposite directions for the classic cutting action of an electric knife.

The subject invention, therefore, provides a drive mechanism for an electric knife which is substantially simpler than the prior art and takes advantage of the more efficient spur gear mechanism. This permits construction of an electric knife with a smaller motor driven by batteries.

It will be apparent to those skilled in the art that various modifications and variations may be made to the drive mechanism of the electric knife of the invention without departing from the scope or spirit of the invention.

What is claimed is:
1. An electric knife comprising:
  (a) housing;
  (b) drive gear means disposed in said housing for rotation about a drive axis;
  (c) power means for selectively rotating said drive gear means;
  (d) a pair of blade holders disposed in said housing in adjacent opposed relation for independent, linear reciprocation parallel to and on opposite sides of an output axis parallel to said drive axis; and
  (e) one piece, integrally formed transmission means for translating rotation of said drive gear means into independent, opposite linear reciprocation of said blade holders, said transmission means comprising a tubular transmission shaft having an internal spur gear integrally formed at one end thereof and a cylindrical cam integrally formed at the other end thereof, said transmission shaft being mounted in said housing for rotation on said output axis with said internal spur gear operatively engaging said drive gear means.

2. The electric knife of claim 1 wherein said power means is a motor disposed in said housing and having a drive shaft and where said drive gear means is a spur gear fixed to said drive shaft.

3. The electric knife of claim 1 also including an output shaft integrally projecting on said output axis from a flange fixed to said motor for rotatably supporting said tubular transmission shaft.

4. The electric knife of claim 1 wherein each said blade holder includes a first end for releasably engaging a blade and a second end including means for operatively engaging said cam.

5. The electric knife of claim 4 wherein each said cam engaging means comprises a cam follower integral with the second end of its respective blade holder, of each said blade holder includes an integral cam follower, each said cam follower operatively engaging said cam 180° apart from the other cam follower.

6. An electric knife, comprising:
  (a) a housing;
  (b) a motor disposed in said housing having a drive shaft;
  (c) a spur gear fixed to said drive shaft for rotation about a drive axis;
  (d) an internal spur gear disposed in said housing in meshing engagement with said spur gear for rotation on an output axis parallel to said drive axis;
  (e) a pair of blade holders disposed in said housing in adjacent, opposed relation for independent, linear reciprocation parallel to and on opposite sides of said output axis, each said blade holder including an intergral cam follower; and
  (f) a cylindrical cam coaxial with and driven by said internal spur gear for rotation about said output axis and being disposed for operatively engaging said cam followers, each said cam follower operatively engaging said cam 180° apart for the other cam follower for generating independent, opposite linear reciprocation of said blade holders in response to rotation of said internal spur gear.

7. Electric knife of claim 6 wherein said internal spur gear is mounted for rotation on an output shaft coaxial with said output axis.

8. Electric knife of claim 7 wherein said output shaft is an intergral projection of a flange fixed to said motor.

9. Electric knife of claim 6 wherein each said blade holder includes a first end for releasably engaging a blade and a second end intergrally formed with said cam follower.

10. The electric knife of claim 6, wherein said internal spur gear and said cam are one piece.

11. The electric knife of claim 6 wherein said cam comprises a coaxial tubular extension of said spur gear having a groove formed on the surface thereof.

12. The electric knife of claim 11, wherein the cam follower of each said blade holder is an integrally-formed projection at the second end thereof disposed to slidably engage said groove.

13. The electric knife of claim 6 wherein said cam includes a tubular projection coaxially engaging said internal spur gear for rotation therewith about said output shaft.

14. The electric knife of claim 6 wherein said cam comprises a rib projecting normal to said output axis and wherein each said cam follower comprises a pair of rollers radially projecting from the second end of said blade holder, said rollers being axially spaced to engage said rib such that rotation of said cam causes linear reciprocation of said blade holder.

15. The electric knife of claim 14 wherein the axial spacing of said rollers is constant and wherein the thickness of said rib is greatest at the points at which said blade holders reverse direction of linear movement.

16. An electric knife comprising:
(a) a housing;
(b) a motor fixed in said housing, said motor having a drive shaft disposed for rotation about a drive axis;
(c) a spur gear fixed to the end of said drive shaft;
(d) a flange fixed to said motor including an integrally-formed, axially-projecting output shaft, said output shaft being coaxial to an output axis parallel to said drive axis;
(e) an output gear disposed on said output shaft for rotation about said output axis, said output gear being in meshing engagement with and driven by said spur gear;
(f) a tubular extension integrally formed with and coaxially projecting from said output gear for rotation therewith about said output axis, said tubular extension including a cylindrical cam slot in the outside surface thereof; and
(g) a pair of blade holders disposed in said housing in adjacent, opposed relation for independent, linear reciprocation parallel to and on opposite sides of said output axis, each said blade holder having a first end for releasably engaging a blade and a second end including an integrally-formed cam follower slidably engaging said cam slot, said cam followers engaging said cam slot 180 degrees apart such that rotation of said output gear generates independent, opposite linear reciprocation of said blade holders.

17. The electric knife comprising:
(a) a housing;
(b) a motor fixed in said housing, said motor having a drive shaft disposed for rotation about a drive axis;
(c) a spur gear fixed to the end of said drive shaft;
(d) a flange fixed to said motor including an integrally formed axially projecting output shaft, said output shaft being coaxial to an output axis parallel to said drive axis;
(e) an output gear disposed on said output shaft for rotation about said output axis, said output gear being in meshing engagement with and driven by said spur gear;
(f) a tubular element axially engaging said output gear for rotation therewith about said output axis, said tubular element including a cylindrical cam rib radially projecting from the outside surface thereof; and
(g) a pair of blade holders disposed in said housing in adjacent, opposed relation for independent, linear reciprocation parallel to and on opposite sides of said output axis, each said blade holder having a first end for releasably engaging a blade and a second end including a cam follower engaging said cam rib, said cam followers engaging said cam rib 180 degrees apart such that rotation of said output gear generates independent, opposite linear reciprocation of said blade holders.

18. The electric knife of claim 16 or 17 wherein said cylindrical cam defines a harmonic path.

19. The electric knife of claim 16 or 17 wherein said cylindrical cam defines a cycloidal path.

* * * * *